Dec. 6, 1966     A. R. GETZIN     3,289,395
FILTER SUPPORT ARRANGEMENT
Filed Nov. 12, 1964
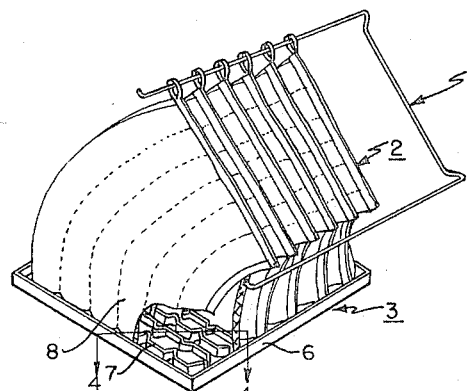
FIG.1
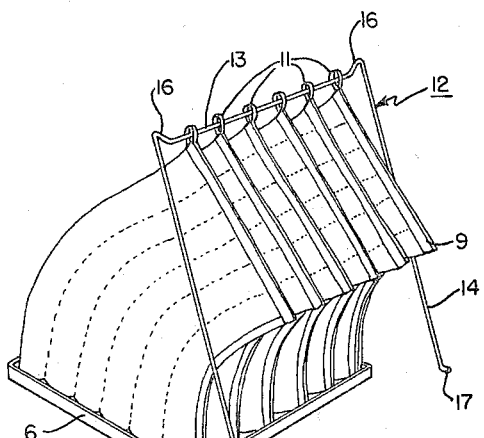
FIG.2
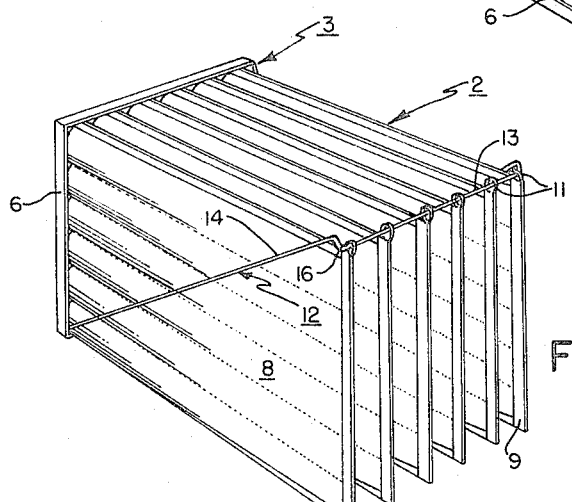
FIG.3
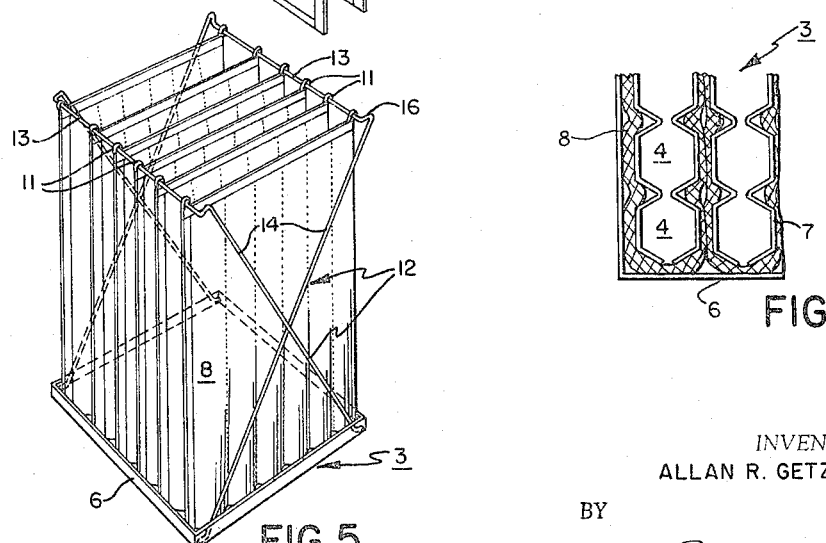
FIG.4
FIG.5
INVENTOR.
ALLAN R. GETZIN
BY
Ralph E. Brick
ATTORNEY

3,289,395
FILTER SUPPORT ARRANGEMENT

Allan R. Getzin, Jeffersontown, Ky., assignor to American Air Filter Company, Inc., Louisville, Ky., a corporation of Delaware
Filed Nov. 12, 1964, Ser. No. 410,565
2 Claims. (Cl. 55—341)

This invention relates to fluid filters and more particularly to an improved filter arrangement wherein high efficiency pocket-type fluid filters are readily and efficiently supported in a fluid stream to be treated.

In accordance with the present invention, an improved fluid filter arrangement is provided which permits pocket-type filters to be supported in a fluid stream to be treated in an economical and straightforward manner with a minimum of materials and with a minimum of assembly steps. With the structural arrangement disclosed herein, it is possible to effectively utilize pocket-type fluid filters in situations where low fluid volumes are to be treated, such low fluid volumes being insufficient in themselves to effect initial opening of the pockets of the filter medium.

Various other features of the present invention will become obvious to one skilled in the art upon reading the disclosure set forth herein.

More particularly, the present invention provides a dust filter apparatus comprising: a set of longitudinally-extending filter pocket means having upstream open-ended mouth portion means; apertured header means fastened to and communicating with the upstream open-ended mouth portion means of the filter pocket means; and longitudinally-extending rod support means attached at one end to the downstream corner of the filter pocket means and at the other end to the upstream header means adjacent the upstream corner of the filter pocket means diametrically opposed to the downstream corner to which the rod support means is attached.

It is to be understood that various changes can be made in the arrangement, form and construction of the apparatus disclosed herein without departing from the scope or spirit of the present invention.

Referring to the drawing:

FIGURE 1 is a partially broken away perspective view of one embodiment of the inventive dust filter apparatus in partially assembled condition;

FIGURE 2 is another perspective view of the apparatus of FIGURE 1 in further partially assembled condition;

FIGURE 3 is still another perspective view of the apparatus of FIGURE 1 in fully assembled condition;

FIGURE 4 is an enlarged, cross-sectional view of a portion of the apparatus of FIGURE 1 taken in a plane passing through line 4—4 of FIGURE 1; and FIGURE 5 is a perspective view of another embodiment of the inventive dust filter apparatus.

As can be seen in FIGURE 1, a pocket-type unit filter arrangement 2 is disclosed wtih which the novel features of the present invention can be readily incorporated. The pocket-type unit filter 2 can be similar to the arrangement set forth in assignee's Patent No. 3,124,441, issued to R. D. Rivers on March 10, 1964. As such, it includes an integral rigid frame or header member 3 which can be of metal or some other suitably rigid material. Header 3 is provided with a series of fluid passageways or apertures 4 and includes outer dependent peripheral border walls 6 and dependent aperture walls 7 which serve to continuously surround apertures 4 and about which the mouths of a set of spaced parallel filter pockets 8 communicably fasten to be displaced in open operating position. Each pocket member 8 includes a pair of substantially identical rectangularly-shaped pocket halves of relatively nonstretchable, porous, pliable, clothlike filtering material. Advantageously, a suitable fabric of fibrous, glass-type material having fibers of substantially one micron in size can be used which, if desired, can be of variable density as is known in the art. Each pocket 8 is provided with a peripheral strip of binding tape or piping 9 which can be of cloth fabric and which is arranged to include a loop support 11. Advantageously, loop support 11 can be integral with and part of tape 9. It is to be understood that loop support 11 can also be a separately fastened loop of cliplike nature if so desired. As can be seen in FIGURE 3, when apertured header 3 is oriented in vertical position with the set of filter pockets 8 extending horizontally therefrom in boxlike fashion, loop supports 11 are aligned along the upper downstream corners of the boxlike set of pockets 8.

To support pockets 8 in a horizontal position, U-shaped rod member 12 is utilized. Rod member 12 includes a base portion 13 and a pair of opposed spaced legs 14, the base portion being offset from the legs by offset elements 16. The extremity of each leg 14 is further provided with a nesting tip 17.

In assembly, rod 12 is appropriately threaded through loops 11 of pockets 8 so that the base portion 13 passes through the loops along the upper downstream corners of the pockets and the legs 14 extend diagonally downward in longitudinal fashion along the outer sides of the boxlike set of pockets to the diametricaly opposed lower upstream corners thereof with nesting tips 17 engaging in the lower corners of header member 3 against border wall 6. Thus, pockets 8 are held in horizontally-extended position in cantilever fashion from vertical header 3 in a straightforward and economical manner with a minimum of assembly steps, U-shaped member 12 being so sized that upon assembly the upper side of each pocket 8 is held in tension and the legs 14 of the U-shaped member are held in compression between base portion 13 of member 12 and the lower corners of header 3. It is to be understood that the U-shaped members can be made from any one of a number of materials and advantageously, a stiff metal rod can be utilized.

Referring to FIGURE 5, an arrangement is disclosed wherein a boxlike set of spaced and parallel filter pockets 8 are held in vertical position. To accomplish this two sets of loop supports 11 are provided at opposite downstream corners of filter pockets 8 and two U-shaped rod members 12 are utilized with one rod member having its base portion 13 passing through a first set of looped supports 11 and its legs 14 extending in a longitiudinal diagonal fashion along the outer sides of the boxlike set of pockets 8to a first pair of opposed upstream corners of the boxlike set of pockets 8 to fasten to an adjacent pair of corners of header member 3. The other U-shaped rod member 12 has its base portion 13 passing through the other set of loop supports 11 and its legs 14 extending in longitudinally diagonal fashion along the outer sides of the boxlike set of pockets in criss-cross relationship to the first set of legs 14 of the first rod member 12 so as to extend to the second pair of opposed upstream corners of the boxlike set of pockets 8 to fasten to a correspondingly adjacent pair of corners of header member 3.

The invention claimed is:
1. Dust filter apparatus comprising: a boxlike set of horizontally-extending, spaced and parallel filter pockets having upstream open-ended mouth portions; a vertically-extending apertured header fastened to and communicating with said upstream open-ended mouth portions of said filter pockets; a single U-shaped rod member comprising the sole support for said set of filter pockets having its base portion extending transverse and adjacent to said upper downstream corners of said pockets; means to fasten said base portions to the upper downstream corners of said pockets, said rod member having its legs extending diagonally downward from said base portion in a longitudinal fashion along the outer sides of said boxlike set of pockets to the diametrically opposed lower upstream corners of said pockets to abuttingly engage with and fasten to adjacent lower corners of said header member, said rod member being sized relative said set of filter pockets to hold the upper sides of said pockets in tension when said pockets are disposed to extend in the horizontal direction with said diagonally extending legs of said rod member being held in compression.

2. Dust filter apparatus comprising: a boxlike set of vertically-extending spaced parallel filter pockets having upstream open-ended mouth portions; a horizontally-extending apertured header fastened to and communicating with said upstream open-ended mouth portions of said filter pockets; a first U-shaped rod member comprising one of two supports for said set of filter pockets having its base portion extending in horizontal direction transverse and adjacent to one set of downstream corners of said filter pockets and having its legs extending in a generally vertical longitudinally diagonal fashion along the outer sides of said boxlike set of pockets to a first pair of opposed upstream corners of said boxlike set of pockets to a first pair of opposed upstream corners of said boxlike set of pockets to abuttingly engage with and fasten to an adjacent pair of corners of said header member; a second U-shaped rod member comprising the other of two supports for said set of filter pockets having its base portion extending in a horizontal direction transverse and adjacent to the other set of downstream corners of said filter pockets and having its legs extending in a generally vertical longitiudinally diagonal fashion along the outer sides of said boxlike set of pockets in crisscross relation to the legs of said first rod member to a second pair of opposed upstream corners of said boxlike set of pockets to abuttingly engage with and fasten to an adjacent pair of corners of said header member; means to fasten said base portions of said rod members to the respectively adjacent sets of downstream corners of said filter pockets, said rod members being sized relative said set of filter pockets to hold the opposed vertically extending sides of said pockets in tension with the diagonally crisscrossed extending legs of said rod members being held in compression.

References Cited by the Examiner

UNITED STATES PATENTS

| | | | |
|---|---|---|---|
| 2,504,821 | 4/1950 | Fowler | 211—86 X |
| 2,607,436 | 8/1952 | Martin | 55—381 X |
| 2,774,443 | 12/1956 | Slayter | 55—379 |
| 3,120,432 | 2/1964 | Aldrich | 55—378 X |
| 3,124,331 | 3/1964 | Rivers | 55—500 |

ROBERT F. BURNETT, *Primary Examiner.*